(12) United States Patent
Degtyar

(10) Patent No.: US 7,725,814 B2
(45) Date of Patent: May 25, 2010

(54) FORM MERGING

(75) Inventor: Rodion Degtyar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 11/197,095

(22) Filed: Aug. 4, 2005

(65) Prior Publication Data

US 2007/0038684 A1 Feb. 15, 2007

(51) Int. Cl.
*G06F 17/18* (2006.01)
*G06F 17/15* (2006.01)

(52) U.S. Cl. .................. 715/221; 715/243; 715/248; 715/251; 715/254

(58) Field of Classification Search .............. 715/243, 715/248, 251, 254
See application file for complete search history.

(56) References Cited

U.S. PATENT DOCUMENTS

| 5,848,184 | A  | * | 12/1998 | Taylor et al. | ................. | 382/173 |
| 6,917,967 | B2 | * | 7/2005  | Wu et al.     | ..................... | 709/213 |
| 7,131,112 | B1 | * | 10/2006 | Bartz et al.  | .................. | 717/122 |
| 7,343,551 | B1 | * | 3/2008  | Bourdev       | ...................... | 715/209 |
| 7,447,713 | B1 | * | 11/2008 | Berkheimer    | ................. | 707/204 |
| 2002/0099685 | A1 | * | 7/2002 | Takano et al. | .................. | 707/1 |

OTHER PUBLICATIONS

Roger Jennings, "Introducing Microsoft Office Info 2003", Published: Microsoft Press, published: Oct. 29, 2003, pp. 1-6.*
Roger Jennings, "Introducing Microsoft Office Infopath 2003", Published: Microsoft Press, published: Oct. 29, 2003, pp. V1-V6.*

* cited by examiner

*Primary Examiner*—Stephen S Hong
*Assistant Examiner*—Wilson Tsui
(74) *Attorney, Agent, or Firm*—Marshall, Gerstein & Borun LLP

(57) ABSTRACT

A form merging system for merging a primary form and a secondary form includes a relationship determination module adapted to determine a relationship between a primary form element on the primary form and a secondary form element on the secondary form and a form element addition module adapted to add the secondary form element to the primary form based on the relationship between the primary form element and a secondary form element. The form merging system allows the primary form customized by a user to be merged with various fields from a newly updated secondary form in an automatic manner.

15 Claims, 9 Drawing Sheets

FIG. 7

Original Form

Tab 1 | Tab 2 | Tab 3

S_org

| Control 1 | Enter Text | Control 7 | Enter Text |
| Control 2 | Enter Text | Control 8 | Enter Text |
| Control 3 | Enter Text | Control 9 | Enter Text |
| Control 4 | Enter Text | Control 10 | Enter Text |
| Control 5 | Enter Text | Control 11 | Enter Text |
| Control 6 | Enter Text | Control 12 | Enter Text |

350
354

Primary Form

Tab 1 | Tab 2 | Tab 3

S_pri_1

| Control 1 | Enter Text | | Enter Text |
| Control 7 | Enter Text | Control 2 | Enter Text |
| Control 3 | Enter Text | Control 6 | Enter Text |

S_pri_2

| Control 4 | Enter Text | Control 5 | Enter Text |
| Control 8 | Enter Text | | Enter Text |

352
356
358

FORM MERGING

BACKGROUND

Computers and computer software makeup a very important part of modern life and business. Specifically, for any business organization to stay competitive, it is imperative that it uses various computer based software to manage data, customers, employees, etc. Businesses use a number of different software for virtually every function of their daily operations, such as payroll, customer relation management, accounting, inventory management. Each of these various pieces of software generally use one or more underlying databases to store data and a number of graphical user interface (GUI) based forms to interact with the computer user. Depending on the business model, there may also be one or more intermediate layers operating between such database and the forms presented to the end user.

In most data-centric applications, forms are the central place for entering and displaying data. For example, accounting software may use a form to present data related to a transaction to a user. Alternatively a form may also be used to allow a user to input data that will be processed by that accounting software and/or stored in the underlying database. For example, a purchase form may be presented to a user of the accounting system to allow the user to input information regarding purchase of an item. Such a purchase form may have various fields, including the general ledger account number, the vendor information, inventory account if the purchased item is an inventory item, an expense account if the purchase item is an expense item, method of payment, payment account, etc. Each of the various fields that are displayed with the form may be attached to related tables in the database. The form may also be attached to one or more objects representing these fields.

Computer applications often provide means for form customizations. Using such customization abilities, end users can change forms by adding, deleting and moving different form elements such as fields, sections, tabs, etc. While such form customization is a big benefit to the end user, it posses considerable problems when trying to merge two or more forms that have been individually customized. Form merging may be necessary for a number of reasons such as: (1) when forms are customized in a previous version of an application, an upgrade to the application needs to merge the new forms with the customized forms that the user has, (2) when forms were independently customized by two different users and both changes need to be merged, (3) when forms are customized by a third party developers to provide a pre-defined vertical business solutions that need to be integrated with the end user's system, etc.

A form merging operation may need to meet a number of criteria that allows continuous use of the forms by the users without any loss to the user experience while at the same time maintaining the integrity of the data attached to the forms. For example, when a customized form is merged with a new version of the form, the merged form should be familiar to the user who prepared the customized form. The user shouldn't have to spend time getting accustomed to the new form layout, which means that the fields and other elements in the merged form should preferably be in the expected places. Similarly, the order and the grouping of the fields in the merged form should be preferably preserved and the merged form should preferably contain all the elements from the new version of the form and these elements should be integrated at the places they were intended to be by the user customizing the form. Moreover, the merged form layout should preferably be natural in a manner so that, ideally, the merged form looks as if the user had manually customized the new form.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A form merging system for merging a primary form and a secondary form includes a relationship determination module adapted to determine a relationship between a primary form element on the primary form and a secondary form element on the secondary form, and a form element addition module adapted to add the secondary form element to the primary form based on the relationship between the primary form element and a secondary form element. The form merging system allows the primary form customized by a user to be merged with various fields from a newly updated secondary form in an automatic manner.

An embodiment of the form merging system provides a program for determining a plurality of relationships between a plurality of primary form elements and a plurality of secondary form elements and for adding the plurality of secondary form elements to the primary form based on the relationships between the plurality of primary form elements and the plurality of secondary form elements.

BRIEF DESCRIPTION OF DRAWINGS

The present patent is illustrated by way of examples and not limitations in the accompanying figures, in which like references indicate similar elements, and in which:

FIG. 7 illustrates examples of an original form and a primary form;

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
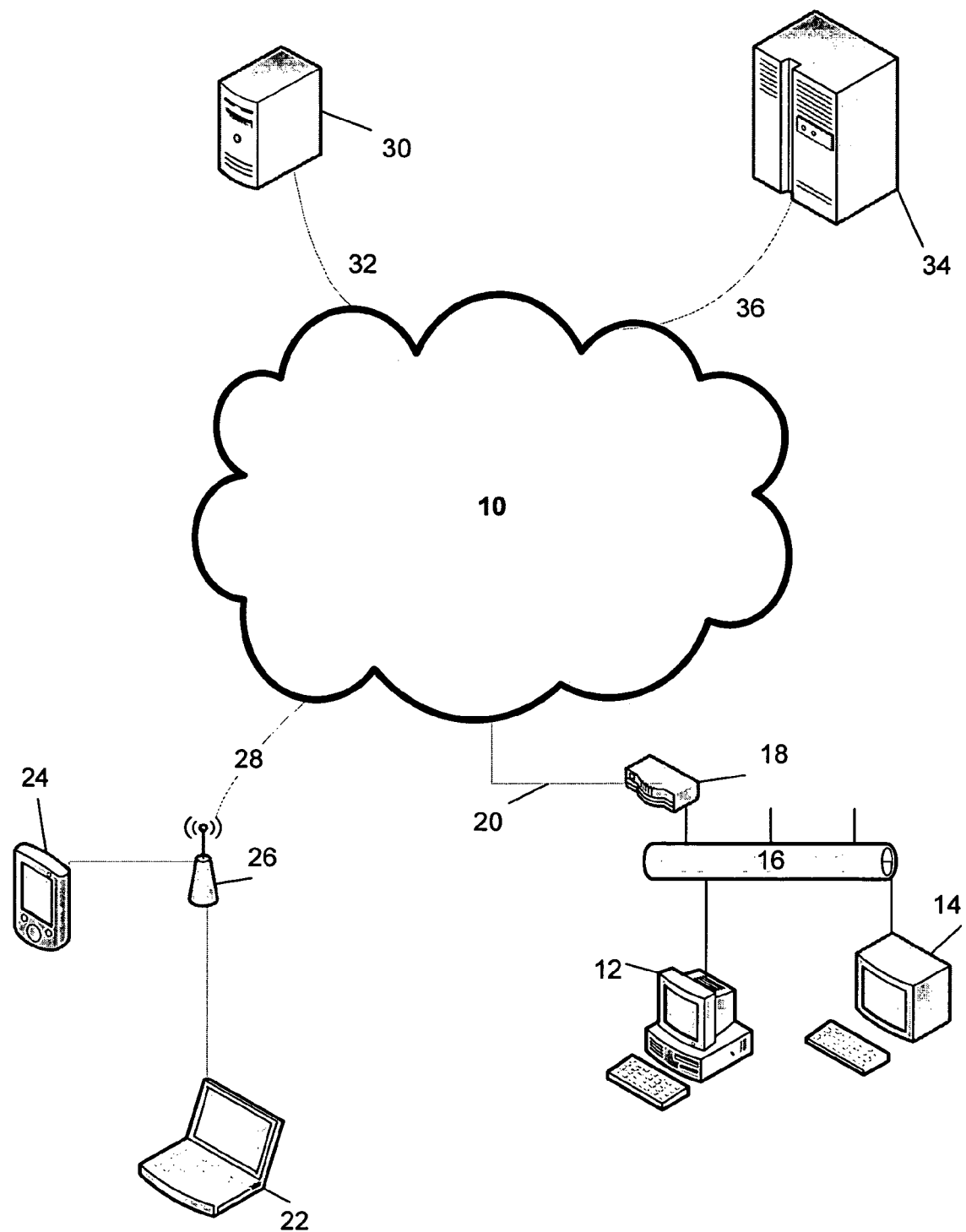
FIG. 1 is a block diagram of a network interconnecting a plurality of computing resources.

FIG. 1 illustrates a network 10 that may be used to implement a form merging system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the form merging system may be stored and operated on any of the various devices connected to the network 10.

Computer

Figure 2:
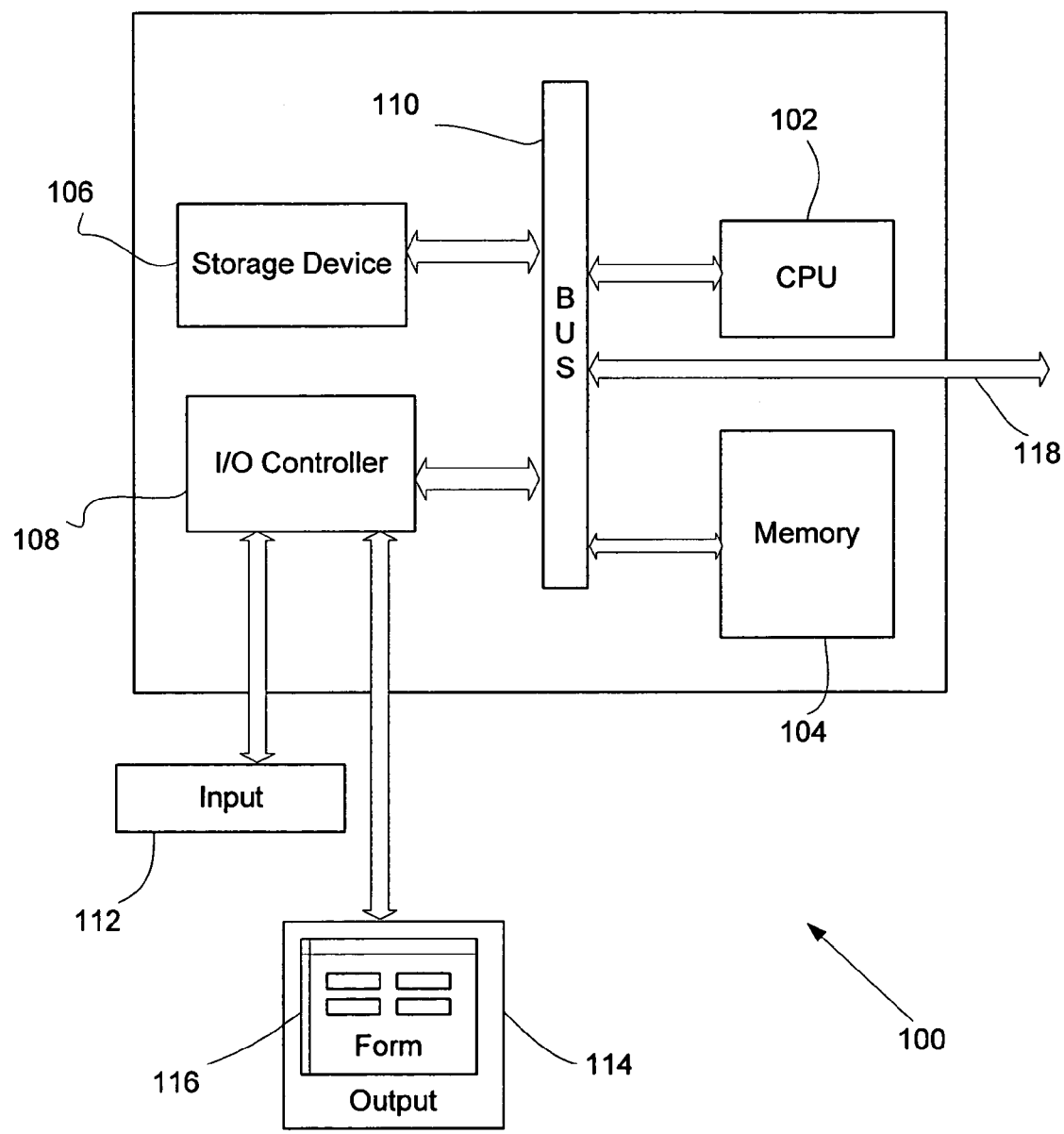
FIG. 2 is a block diagram of a computer that may be connected to the network of FIG. 1.

FIG. 2 illustrates a computing device in the form of a computer 100 that may be connected to the network 10 and used to implement one or more components of a form merging system. Components of the computer 110 may include, but are not limited to a central processing unit (CPU) 102, a memory 104, a storage device 106, an input/output controller 108, and a system bus 110 that couples various system components including the memory to the CPU 102. The system bus 110 may be any of several types of bus structures including a memory bus or memory controller, a peripheral bus, and a local bus using any of a variety of bus architectures.

The memory 104 may include computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 120. The memory 104 may also be used to store data related to one or more forms used by the computer 100.

The storage device 106 may typically include removable/non-removable, volatile/nonvolatile computer storage media. By way of example only, the storage device 106 may include a hard disk drive, a magnetic disk drive, nonvolatile magnetic disk 152, an optical disk drive, etc. One or more of the forms stored on the memory 104 may be populated using data stored on the storage device 106.

The I/O controller may be used by the computer to communicate with an input device 112, which may be a keyboard, etc., an output device 114, which may be a monitor, a printer, etc. The output device 114 is shown to display a form 116, which may be stored on the memory 104 and may be populated by data from the storage device 106. Alternatively, a user may use the input device 112 to input data into the form 116. The computer 100 may also be connected to the network 10 via an external communication bus 118.

Form Merging System

Figure 3:
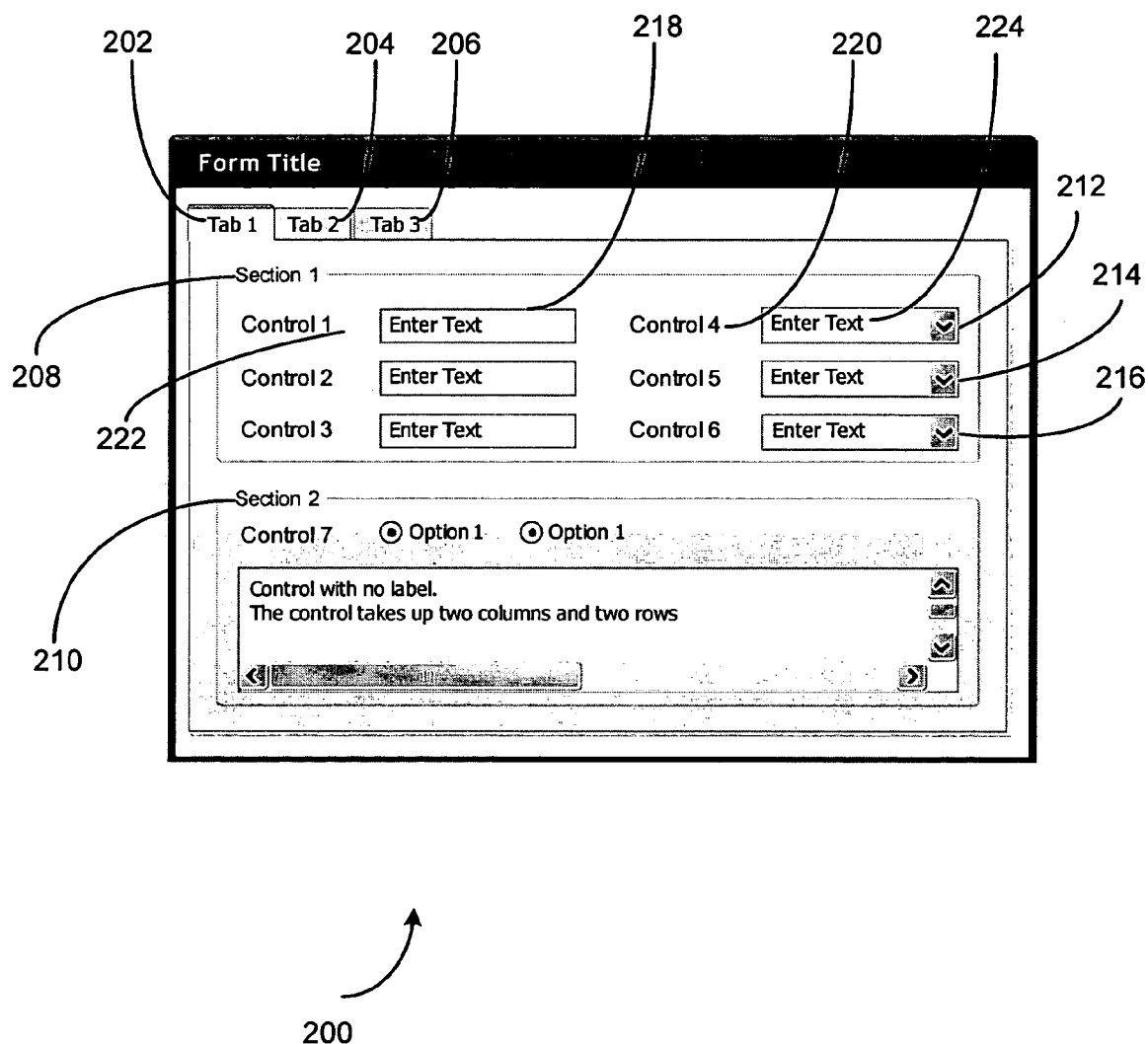
FIG. 3 illustrates a block diagram of an exemplary form.

FIG. 3 illustrates a flowchart of a block diagram of an exemplary form 200 that may be used by a computer application. The form 200 may consist of various form elements such as tabs, sections, controls, etc. For example, the form 200 contains three tabs tab 202, tab 204 and tab 206. While the tabs 202-206 are named simply as tab1, tab2 and tab3, in an alternate implementation, the tabs 202-206 may have more descriptive titles. For example, if the form 200 is used by an accounting application, the tabs 202-206 may be titled as, for example, checking, saving and money-market, respectively. Moreover, a user of the form 200 may be able to add or delete one of the tabs 202-206 as well as change the titles of the tabs 202-206.

Each of the tables 202-206 logically groups a number of fields into one viewable area. A tab may be further subdivided into sections, for example, the tab 202 is shown to be subdivided into two sections, namely, section 208 and section 210. Each of the sections 208-210 provides a next level of control grouping. A section may be viewed as a table so that every section has a number of rows, each row containing cells with zero or one controls. For example, the section 208 is shown to have three rows 212, 214 and 216 and two columns, therefore having a total of six cells of which the cells 218 and 220 are located in row 1. Furthermore, the cells 218 and 220 may include control elements 222 and 224. Generally speaking, a cell can span multiple columns and/or rows. The number of columns may be fixed per section, however, different sections can have different number of columns.

Figure 4:
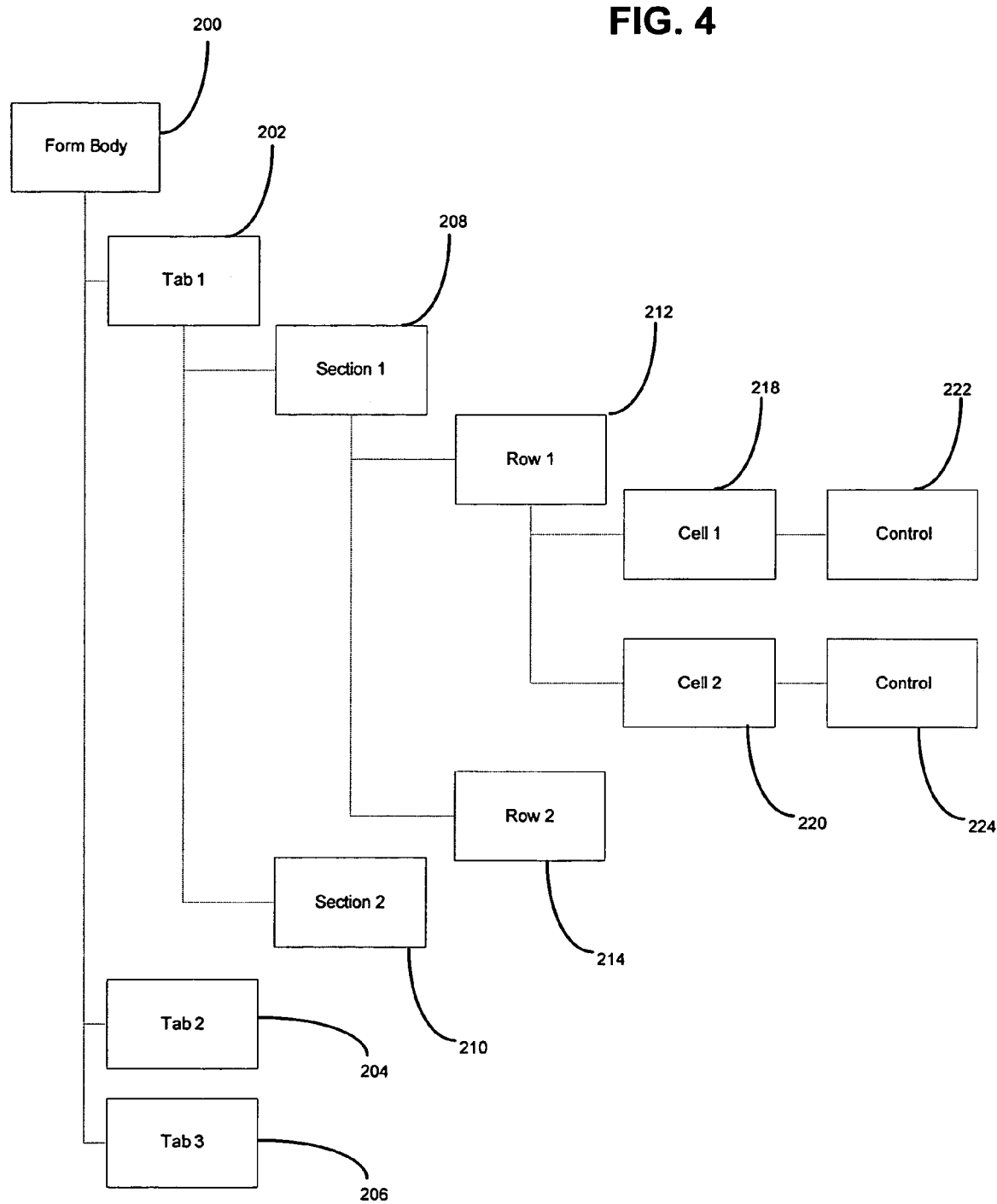
FIG. 4 illustrates a tree diagram illustrating various elements of the form of FIG. 3.

The structure of the form 200 may be described by a hierarchical tree structure with form being the root of the tree and various form elements being the branches and/or the leaves of such a hierarchical tree. An example of such a partial hierarchical tree structure 220 is illustrated in FIG. 4. As shown in FIG. 4, the tree structure 220 has the form 200 as the root and the controls 222 and 224 being the leaves of the hierarchical tree structure.

As mentioned above, generally, a user of the form 200 may customize the form 200 as to his/her liking. Moreover, the developer of the application that includes the form 200 may also update the form 200 to accommodate changes in the application or its data structure. In such a situation, when the updated application is delivered to the user, it is necessary that the customizations made by the user are not lost when using the new version of the application. A merging program that allows such merging of the user customized form and the form included in the new version of the application is described below. For illustration purposes only, the form provided by the previous (original) version of the application is referred to in here as an original form, whereas the customized form including the customizations by the user is referred to as the primary form and the new version of the form that may accompany new version/release of the application is referred to as the secondary form.

Figure 5:
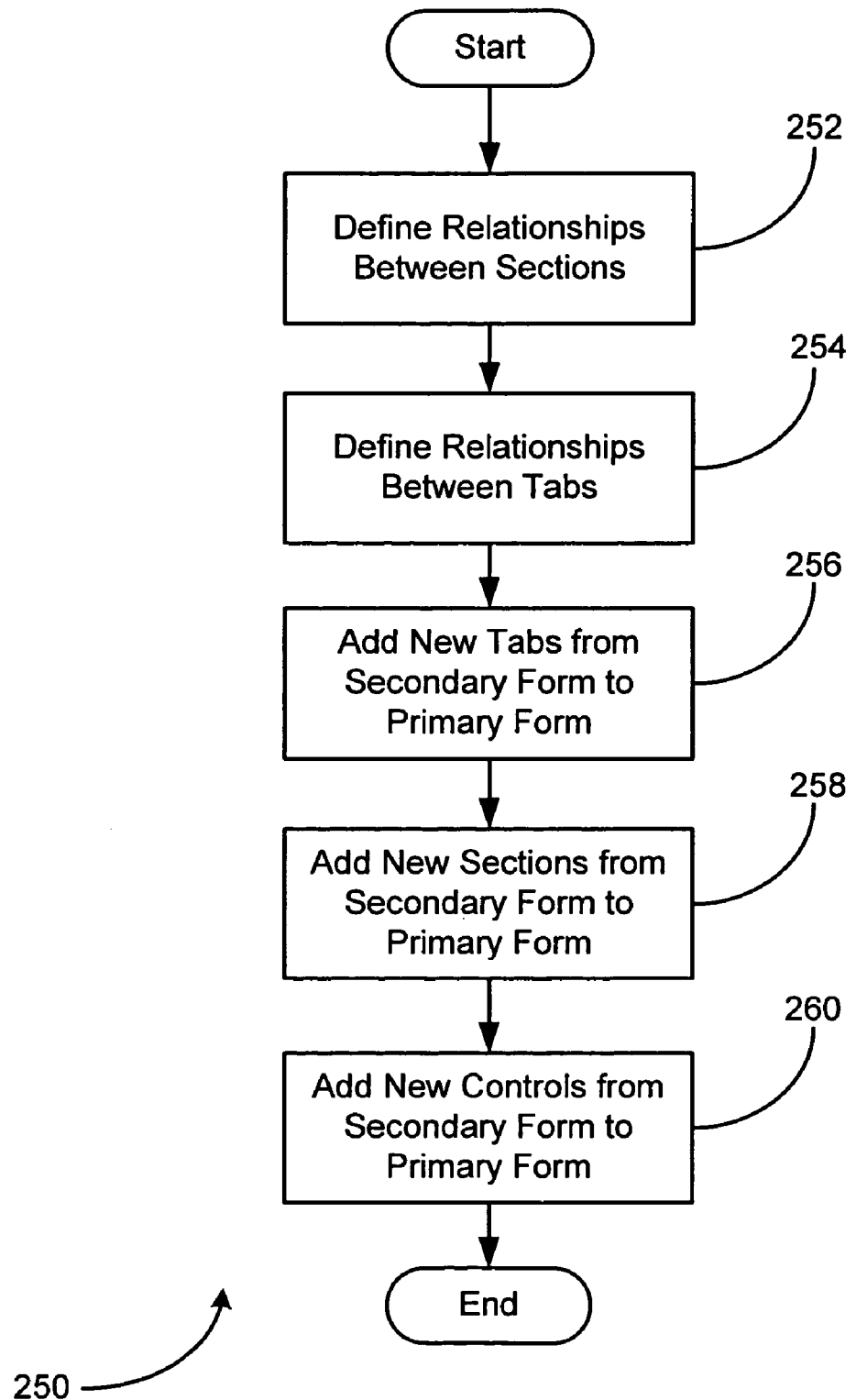
FIG. 5 illustrates a flowchart of a form merging program.

FIG. 5 illustrates a block diagram of the merging program 250 that may be used to merge a primary form and a secondary form. Specifically, the merging program 250 is used to merge the primary form and the secondary form in a manner so that the merged form preserves the layout of the primary form as much as possible so that the merged form does not affect the usability. Generally, the merging program 250 does not move or delete any elements from the primary form, however, it may add elements from the secondary form to the primary form.

Specifically, a block 252 may define relationships between various section of the primary form and the secondary form. In order to add controls into the right places on the primary form during the merge process, it may be necessary to define to which sections it is necessary to add controls. The basic idea behind this is that if sections have similar content, for example, in terms of the fields they contain, they may be considered to be the same. Alternatively, the merging program may also use some other information, such as section label (the assumption here being that if the section label hasn't changed it means the section meaning/purpose wasn't changed) to establish relationships between various sections of the primary form and secondary form. Because both the primary form and the secondary form derive from a common original form, the merging program may use this information to establish section relationships.

Generally, defining relationships between various sections of the primary form and the secondary form includes (1) establishing relationships between various sections of the original form and the various sections of the primary form, (2) establishing relationships between various sections of the original form and the various sections of secondary forms, and (3) establishing relationships between various sections of the primary form and the various sections of secondary forms using the relationships between various sections of the original form and the various sections of the primary form and the relationships between various sections of the original form and the various sections of secondary forms.

A program used to establish relationships between various sections of the original form and the various sections of the primary form is illustrated in further detail below in FIGS. 6 and 7. Because establishing relationships between various sections of the original form and the various sections of secondary forms is similar in nature to establishing relationships between various sections of the original form and the various sections of the primary form, such a program used to establish relationships between various sections of the original form and the various sections of secondary forms is not described.

Subsequently, a block 254 may define relationships between various tabs of the primary form and the secondary form. When defining relationships between various tabs of the primary form and the secondary form, the process is very similar to defining relationships between various sections of the primary form and the secondary form. Because tabs have the same relation with section as the sections have with the controls, the process of defining relationships between various tabs of the primary form and the secondary form can be described by the process of defining relationships between various tabs of the primary form and the secondary form wherein all usage of sections are changed to tabs and all usage of controls are changed to sections.

When implementing the program 250, the code used for implementing the steps 252 and 254 may be designed by abstracting tabs/sections as containers that have a collection of items. For example, when using such code to implement the step 252, the containers may be tabs wherein each tab has a collection of sections, whereas when implementing the step 254, the containers may be sections wherein each section has a collection of controls/fields (the terms "controls" and "fields" as used herein are interchangeable).

A block 256 adds new tabs from the secondary form to the primary form. Exemplary pseudocode illustrating how to add tabs from a secondary form to a primary form is illustrated below by a pseudocode function AddTabToForm and a call to such a function.

```
foreach (FormTab tab in secondaryForm.Tas)
{
    if (!primaryForm.Tabs.Contains(tab.id))
    {
        AddTabToForm(tab, primaryForm);
    }
}
public void AddTabToForm(FormTab tab, Form form)
{
    previousTab = tab.PreviousTab;
    nextTab = tab.NextTab;
    if (form.Tabs.Contain(previousTab.ID))
    {
        form.InsertTabAfter(form.Tabs[preciousTab.ID]);
    }
    else if (form.Contains(nextTab.ID))
    {
        form.InsertTabBefore(form.Tabs[NextTab.ID]);
    }
    else
    {
        form.InsertTabAfter(form.Tabs.LastTab)
    }
}
```

Subsequently, a block 258 adds new sections from the secondary form to the primary form. Adding new sections from the secondary form to the primary form is very similar to adding new tabs from the secondary form to the primary form by simply substituting all the usages of tabs with sections. One difference is that new sections should be added to the corresponding tabs, therefore, while adding a particular section to a primary form. If there is no corresponding tab in the primary form for that particular section, it may be necessary to create a new Upgrade_Conflict tab to the primary section and subsequently, that particular section may be added to the newly created to Upgrade_Conflict tab. Exemplary pseudocode illustrating how to add sections from a secondary form to a primary form is illustrated below by a pseudocode function AddSectionToForm and a call to such a function.

```
foreach (FormSection section in secondaryForm.Tas)
{
    if (!primaryForm.Sections.Contains(section.id))
    {
        AddSectionToForm(section, primaryForm);
    }
}
public void AddSectionToForm (FormSection section, Form form)
{
    previousSection = section.PreviousSection;
    nextSection = section.NextSection;
    if (form.sections.Contain(previousSection.ID))
    {
        form.InsertSectionAfter(form.Sections[preciousSection.ID]);
    }
    else if (form.Contains(nextSection.ID))
    {
        form.InsertSectionBefore(form.Sections[NextSection.ID]);
    }
    else
    {
        form.InsertSectionAfter(form.Sections.LastSection)
    }
}
```

Subsequently, a block 260 adds new controls from the secondary form to the primary form. Generally, controls from a particular section of the secondary section should be added to sections on the primary form corresponding to that particular section. Such correspondence may be based on the relationships between various forms of the primary form and the secondary form, as determined above by the block 252. As all the new sections from the secondary forms are added to the primary form by the block 258, it is easy to find such corresponding sections between the primary form and the secondary form. Generally, while adding controls from the secondary form to the primary form, controls on a particular line and column of a particular section on the secondary form should be added to the corresponding line and column of the corresponding column on the primary form. Exemplary pseudocode illustrating how to add control from a secondary form to a primary form is illustrated below by pseudocode functions InsrtControl and InsertControlAfter.

CountTotal) that exist on the primary form, irrespective of which section such a control is in.

Subsequently, a block 306 initiates a counter i. A block 308 may calculate a number (fieldCount[i]) of controls from the section S_org that belong to a section S_pri[i]. Subsequently, a block 310 may calculate a ratio of number of controls from the section S_org, (fieldCount[i]), and the total number of controls on the section S_org (FieldCountTotal), referred to as fieldCountRatio[i].

A block 312 determines if the counter i is greater than the total number of sections on the primary form. If the block 312 determines that the counter i is not greater than the total number of sections on the primary form, a block 314 increments i by one and control passes to block 308. However, if the block 312 determines that the counter i is greater than the total number of sections on the primary form, it passes control to a block 316.

```
foreach (FormSection section in secondaryForm.Sections)
{
    foreach (FormColumn column in section)
    {
        foreach (new control in the column)
        {
            InsertControl(section, control, column.Index);
        }
    }
}
public void InsertControl(Section section, Control control, int columnIndex)
{
    foreach (FormRow row in section.Rows)
    {
        Control previousControl = row.PreviousRow.Controls[columnIndex];
        Control nextControl = row.NextRow.Controls[columnIndex];
        Control previousControl2 = primaryForm.GetControl(previousControl.ID);
        Control nextControl2 = primaryForm.GetControl(nextControl.ID);
        if (null != previousControl2 && columnIndex == previousControl2.ColumnInd$$
        {
            InsertControlAfter(control, previousControl2);
        }
        else if (null != nextControl2 && columnIndex == nextControl2.ColumnIndex)
        {
            InsertControlBefore(control, nextControl2, columnIndex);
        }
        else
        {
            InsertControlAfter(control, primaryForm.LastRow, columnIndex);
        }
    }
}
public void InsertControlAfter(Section section, Control control, FormRow row, int columnIndex)
{
    FormCell cell = section.Rows[row.index + 1].Cells[columnindex];
    if (cell.IsEmpty) // If there is an ampty place for our control
    {
        IncertControlInEmptyCell(control, cell);
    }
    else
    {
        // Otherwise create an empty row and insert the control
        FormRow = section.Rows.InsertAfter(row.index);
        // We have a section full of empty cells
        IncertControlInEmptyCell(control, row.Cells[columnIndex]);
    }
}
```

Figure 6:
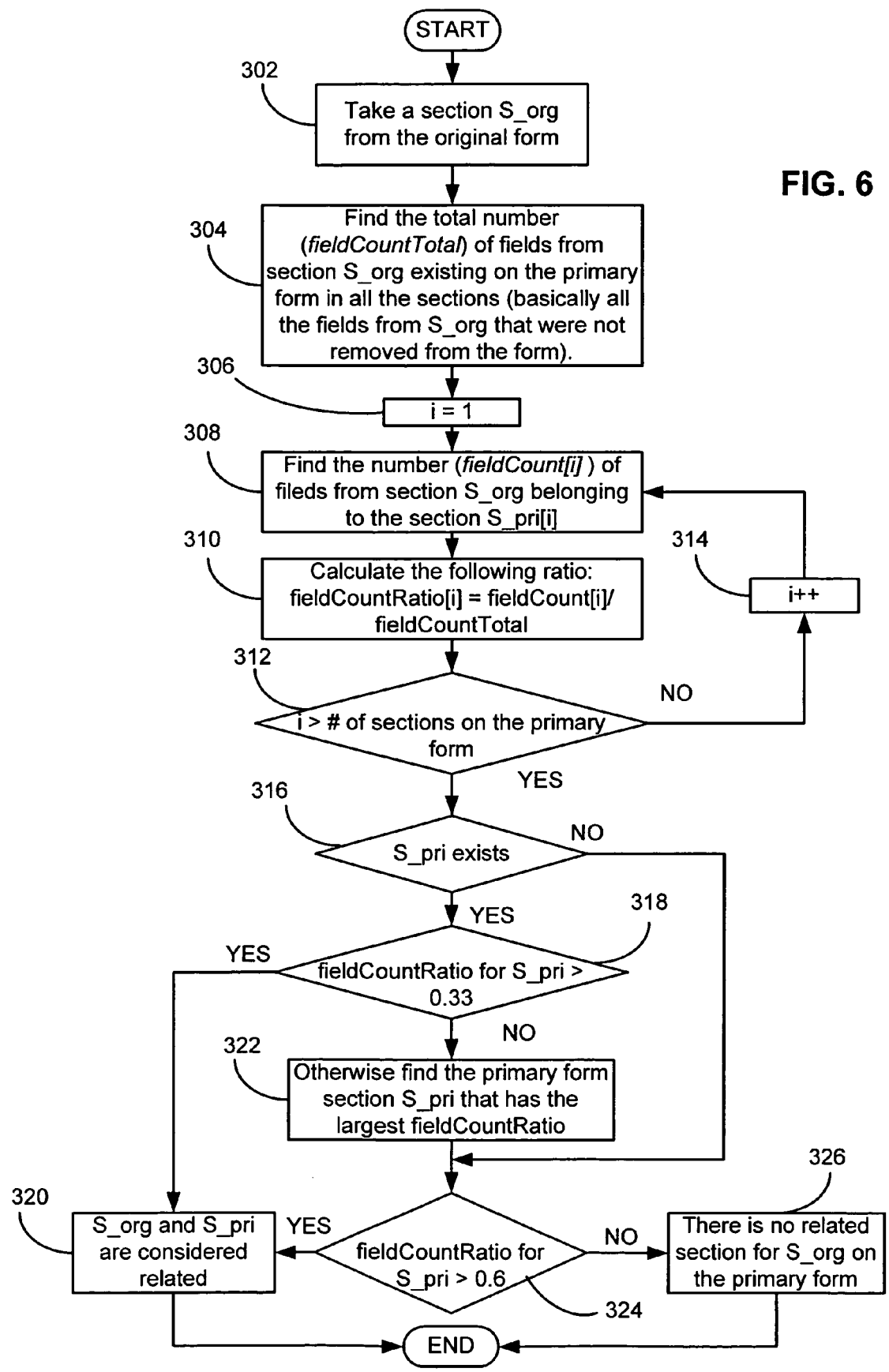
FIG. 6 illustrates a flowchart of a program used to establish relationships between various form elements.

Now referring to FIG. 6, a program 300 illustrates defining relationships between a primary form section and one or more form sections of the original form. A block 302 may select a section S_org from the original form. A block 304 may determine the total number of controls on the section S_org (Field- The block 316 determines whether the primary form has any section S_pri that has the same label as the label of the original form section S_org. If such a primary form section S_pri exists, the block 316 passes control to a block 318, otherwise, control is transferred to a block 324.

The block 318 compares the fieldCountRatio for primary section S_pri to a first threshold value. If the fieldCountRatio for primary section S_pri is determined to be greater than the first threshold value, control is transferred to a block 320 which registers that the original form section S_org and the primary form section S_pri are related to each other. In an implementation of the program 300, the first threshold value may be equal to 0.33.

If the fieldCountRatio for primary section S_pri is not determined to be greater than the first threshold value, control is transferred to a block 322, which finds a primary form section S_pri that has the largest fieldCountRatio. Subsequently, a block 324 compares such largest fieldCountRatio with a second threshold value. If the block 324 determines that such largest fieldCountRatio is greater than the second threshold, the block 320 registers that the original form section S_org is related to the primary form section S_pri. However, if the block 324 determines that such largest fieldCountRatio is not greater than the second threshold, a block 326 registers that the primary form does not have any section related to the original form section S_org. In an implementation of the program 300, the second threshold value may be equal to 0.60. Generally, the second threshold value is significantly higher than the first threshold value.

FIG. 7 illustrates exemplary functioning of the program 300. Specifically, the functioning of the program 300 is illustrated with respect to an original form 350 that may be customized by a user to a primary form 352. As shown in FIG. 7, the original form 350 includes an original form section S_org 354. The primary form 352 includes a first section S_pri_1 356 and a second section S_pri_2 358. The primary form 352 includes only some of the controls, namely controls 1-8, from the original form 350, whereas the controls 9-12 from the original form 350 are not present in the primary form. Moreover, the controls 1-8 are also scattered among the two different sections, the first section S_pri_1 356 and the second section S_pri_2 358.

Applying the program 300 to find relationships between sections of the original form 350 and the primary form 352, the block 304 will determine that the total number of fields (fieldCountTotal) from the original form 350 that are present on the primary form 352 is equal to 8 (that is fields 1 to 8). Subsequently the block 310 will determine that the number of fields from the section S_org 354 that are present on the first section S_pri_1 356 is equal to 5 (namely, fields 1, 2, 3, 6 and 7). Thus fieldCount_S_pri_1 is equal to 5. Similarly, the block 310 will determine that the number of fields from the section S_org 354 that are present on the second section S_pri_2 358 is equal to 3 (namely, fields 4, 5 and 8). Thus fieldCount_S_pri_1 is equal to 3.

Therefore, the block 310 will determine the fieldCountRatio_1 for the first section S_pri_1 356 to be equal to 5/8 (0.625), whereas the fieldCountRatio_2 for the second section S_pri_1 358 to be equal to 3/8 (0.375). Subsequently, the block 324 will determine if the second section S_pri_2 358 has the same label as the section S_org 354, in which case the program 300 will determine the second section S_pri_2 358 to have a relationship with the section S_org 354 of the original form 350 (because the fieldCountRatio_2 for the second section S_pri_2 358 is greater than 0.33). If the second section S_pri_2 358 does not have the same label as the section S_org 354, the program 300 will determine the first section S_pri_1 356 to have a relationship with the section S_org 354 of the original form 350 as the fieldCountRatio_1 or the first section S_pri_2 356 is greater than 0.60.

Once the relationships between the various sections of the primary form and the original form have been established, using a similar algorithm, relationships between the various sections of the secondary form and the original form is also established. At this point using these relationships, the block 252 defines relationships between the various sections of the primary form to the various sections of the secondary form. Such establishing of relationships between various sections of the primary form and sections of the secondary form is illustrated in FIG. 8.

Figure 8:
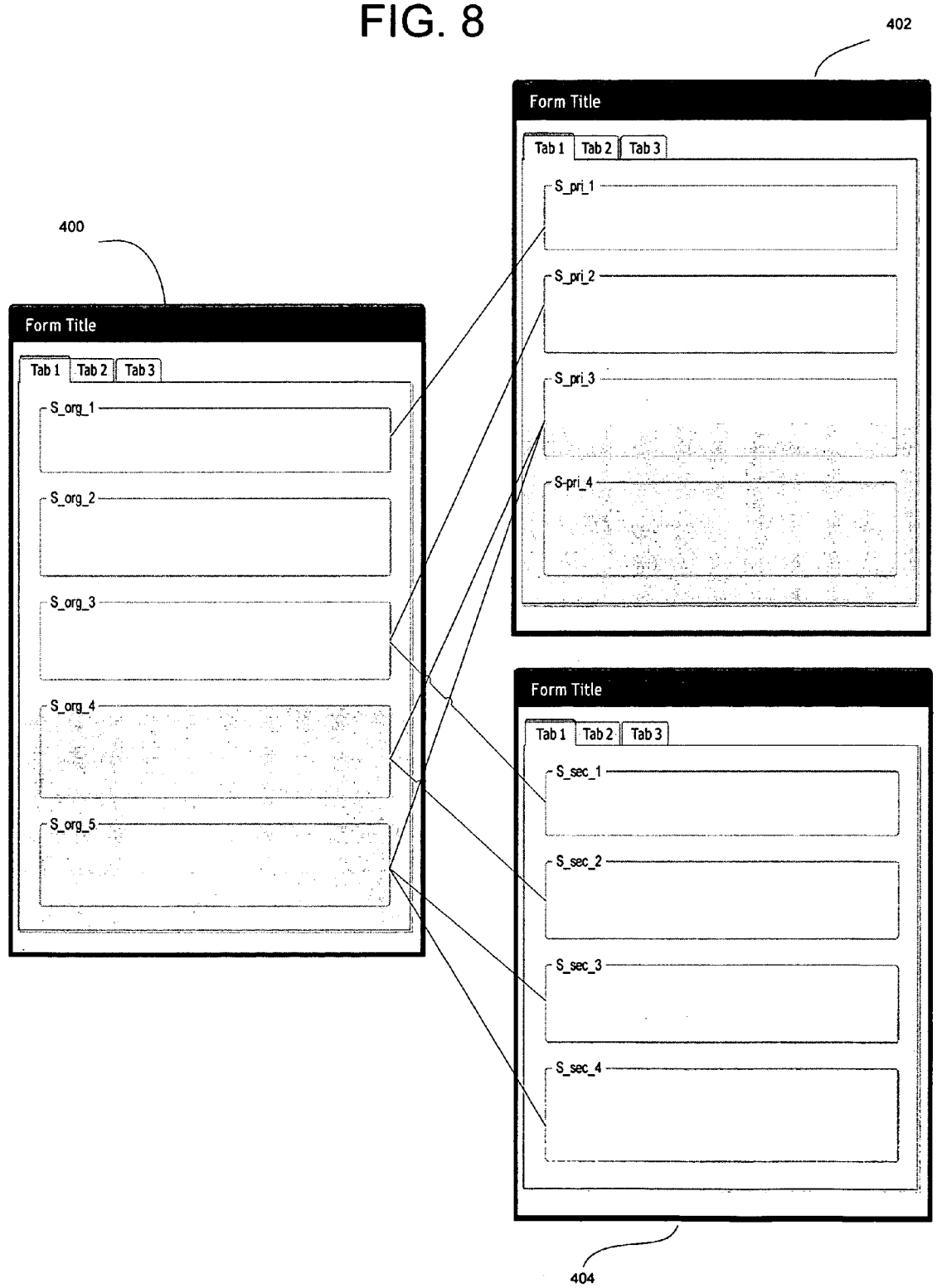
FIG. 8 illustrates results of execution of an algorithm establishing relationships between various form elements.

Specifically, FIG. 8 illustrates an original form 400 that is customized to a primary form 402 and updated to a secondary form 404. In this example the primary form section S_pri_1 corresponds to the original form section S_org_1. However no relationships are found for the primary form section S_pri_4. Relationships are basically 1:n mappings from the primary form sections and secondary form sections to the original form sections. In many cases there is one original form section related to the corresponding primary/secondary form section. However there might be cases when several original form sections relate to the one primary/secondary form section. This can happen for example when two or more sections were merged into one.

Now that all relationships between the primary/secondary and the original sections are established, the block 252 may find the relationships between the primary form sections and the secondary form sections. For example, because the S_pri_2 relates to S_org_2 and S_org_2 relates to S_sec_1, the block 252 may determine that S_pri_2 relates to S_sec_1. The block 252 may also treat sections/relations as a two-level directional graph with sections being nodes and relations being edges. Such a graph may consist of a number of trees with roots at the primary form sections and the leaves at the secondary form sections.

Figure 9:
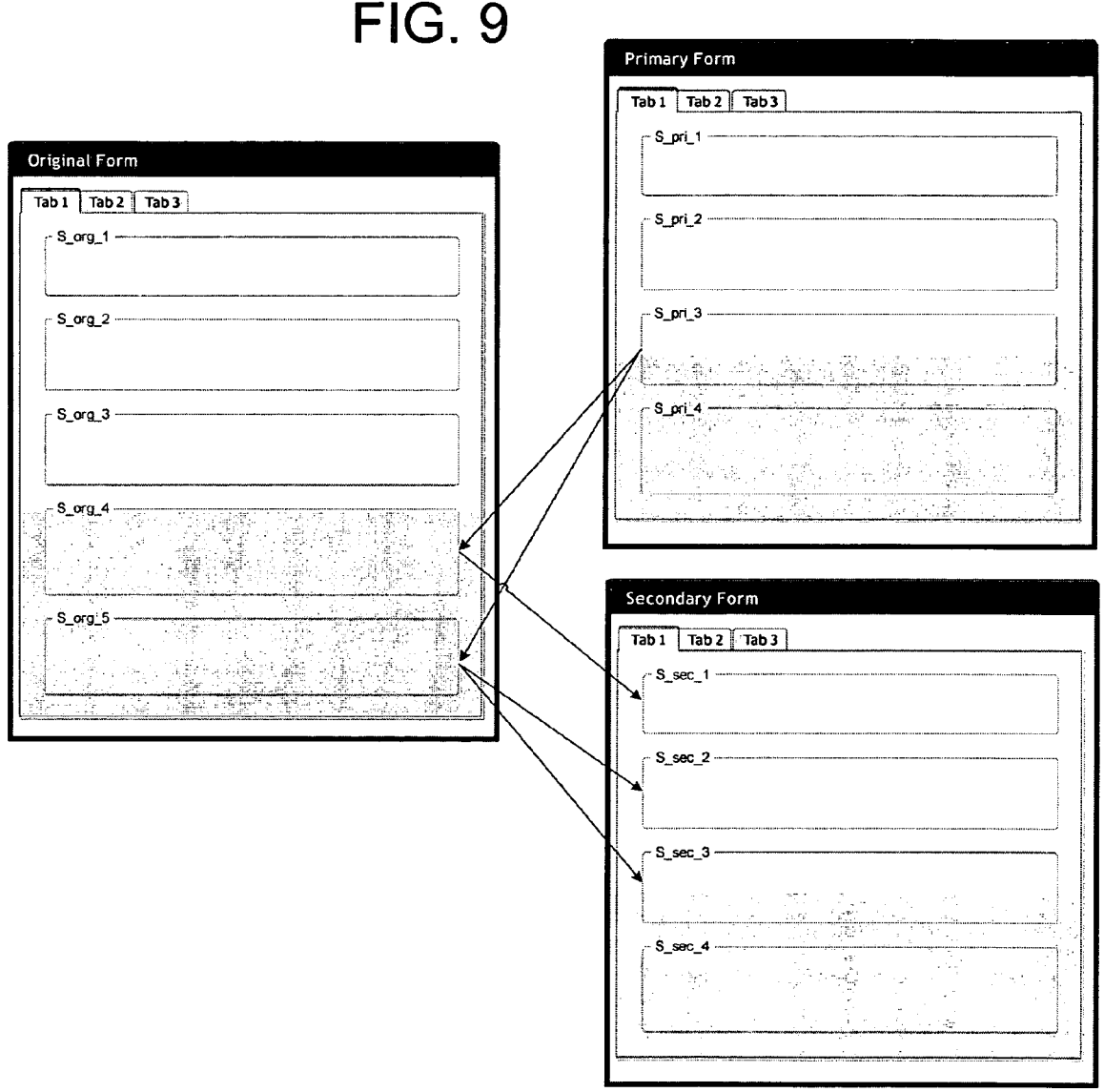
FIG. 9 illustrates resolving of one-to-many relationships between various form elements.

The FIG. 9 illustrates one such tree with the root at S_pri_3. In this case, the block 252 may find all the leaves of the tree, for example, by using the breadth-first search algorithm, and pick only one leaf section as the related one. In the example illustrated in FIG. 9, there are three candidates for a relationship with the root S_pri_3, namely, S_sec_2, S_sec_3 and S_sec_4. The block 252 may use a number of different criteria to single out a section, including: (1) pick the section that has the largest number of controls carried out from the related original section; (2) pick the section that has the same label as the related original section; or (3) pick the section that has the largest ratio of controls carried out from the related original section over the total number of controls in the section. Note that any of these criteria may produce multiple sections (e.g. both S_sec_2 and S_sec_4 may have their labels unchanged). In such a case the block 252 may further narrow down the search by applying other criteria.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of merging a primary GUI-based form and a secondary GUI-based form, each form comprising one or more GUI form elements, the method comprising:
- comparing content of the primary form with the content of the secondary form in an automated manner;
- determining whether a primary form element on the primary form is related to a secondary form element on the secondary form based on the comparison of the content of the primary form with the content of the secondary form; and
- if the primary form element is related to the secondary form element adding the secondary form element to the primary form based on the relationship between the primary form element and the secondary form element;
- wherein determining a relationship between a primary form element and a secondary form element includes:
  - determining a relationship between the primary form element and an original form element;
  - determining a relationship between the secondary form element and the original form element; and
  - determining the relationship between the primary form element and the secondary form element based on the relationship between the primary form element and the original form element and the relationship between the secondary form element and the original form element;
- wherein determining a relationship between the primary form element and an original form element comprises:
  - determining a number of fields in the original form element;
  - determining a number of fields from the original form element belonging to the primary form element;
  - determining a primary field count ratio using the number of fields in the original form element and the number of fields from the original form element belonging to the primary form element;
  - comparing the primary field count ratio to a first threshold if the name of the original form element is same as the name of the primary form element, and determining that the original form element is related to the primary form element if the primary field count ratio is above the first threshold; and
  - if either (a) the name of the original form element is the same as the name of the primary form element and the primary field count ratio is less than the first threshold, or (b) the name of the original form element is different than the name of the primary form element, comparing the primary field count ratio to a second threshold and determining that the original form element is related to the primary form element if the primary field count ratio is greater than the second threshold, and
- wherein determining a relationship between the secondary form element and the original form element comprises:
  - determining a number of fields from the original form element belonging to the secondary form element;
  - determining a secondary field count ratio using the number of fields in the original form element and the number of fields from the original form element belonging to the secondary form element;
  - comparing the secondary field count ratio to the first threshold if the name of the original form element is same as the name of the secondary form element; and determining that the original form element is related to secondary form element if the secondary field count ratio is above the first threshold; and
  - if either (a) the name of the original form element is the same as the name of the secondary form element and the secondary field count ratio is less than the first threshold, or (b) the name of the original form element is different than the name of the secondary form element, comparing the secondary field count ratio to the second threshold and determining that the original form element is related to the secondary form element if the secondary field count ratio is greater than the second threshold.

2. A method of claim 1, wherein comparing content of the primary form with the content of the secondary form further comprises:
- comparing content of a plurality of primary form sections with content of a plurality of secondary form sections; and
- comparing labels of the plurality of primary form sections with labels of the plurality of secondary form sections.

3. A method of claim 1, wherein the form elements include at least one of: (1) a tab; (2) a section; or (3) a control.

4. A method of claim 1, wherein:
- determining a relationship between a primary form element and a secondary form element further comprises determining a plurality of relationships between a plurality of primary form elements and a plurality of secondary form elements; and
- adding the secondary form element to the primary form further comprises adding the plurality of secondary form elements to the primary form based on the relationships between a plurality of primary form elements and a plurality of secondary form elements.

5. A method of claim 1, wherein the first threshold is approximately equal to 0.33 and the second threshold is approximately equal to 0.6.

6. A method of claim 1, wherein determining the relationship between the primary form element and the secondary form element further comprises determining the relationship between the primary form element and the secondary form element using a breadth-first-search algorithm.

7. A method of claim 1, wherein determining the relationship between the primary form element and the secondary form element further comprises determining the relationship between the primary form element and the secondary form element by at least one of: (1) selecting a secondary form element that has a largest number of fields corresponding to the primary form element; (2) selecting a secondary form element that has a same label as a label of the primary form element; or (3) selecting a secondary form element that has a largest secondary field count ratio, wherein the secondary field count ratio is determined using the number of fields in the original form element and number of fields from the original form element belonging to the secondary form element.

8. A form merging system for merging a primary GUI-based form and a secondary GUI-based form, each form comprising one or more GUI form elements, and the system comprising a plurality of modules executable by a processor and stored on a machine-readable storage medium, the plurality of modules comprising:
- a comparison module adapted to compare content of the primary form with the content of the secondary form in an automated manner;
- a relationship determination module adapted to determine whether a primary form element on the primary form is related to a secondary form element on the secondary form based on the comparison of content of the primary form with content of the secondary form; and a form element addition module adapted to add the secondary form element to the primary form if the primary form element is related to the secondary form element;

wherein the relationship determination module is further adapted to:

determine a relationship between the primary form element and an original form element;

determine a relationship between the secondary form element and the original form element; and determine the relationship between the primary form element and the secondary form element based on the relationship between the primary form element and the original form element and the relationship between the secondary form element and the original form element; and wherein the relationship determination module is further adapted to:

determine number of fields in the original form element;

determine number of fields from the original form element belonging to the primary form element;

determine a primary field count ratio using the number of fields in the original form element and number of fields from the original form element belonging to the primary form element;

compare the primary field count ratio to a first threshold if the name of the original form element is same as the name of the primary form element, and determine that the original form element is related to the primary form element if the primary field count ratio is above the first threshold; and if either (a) the name of the original form element is the same as the name of the primary form element and the primary field count ratio is less than the first threshold, or (b) the name of the original form element is different than the name of the primary form element, compare the primary field count ratio to a second threshold and determine that the original form element is related to the primary form element if the primary field count ratio is greater than the second threshold;

determine a number of fields from the original form element belonging to the secondary form element;

determine a secondary field count ratio using the number of fields in the original form element and the number of fields from the original form element belonging to the secondary form element;

compare the secondary field count ratio to the first threshold if the name of the original form element is same as the name of the secondary form element; and determine that the original form element is related to secondary form element if the secondary field count ratio is above the first threshold; and if either (a) the name of the original form element is the same as the name of the secondary form element and the secondary field count ratio is less than the first threshold, or (b) the name of the original form element is different than the name of the secondary form element, compare the secondary field count ratio to the second threshold and determine that the original form element is related to the secondary form element if the secondary field count ratio is greater than the second threshold.

9. A form merging system of claim 8, wherein the form element is at least one of: (1) a tab; (2) a section; or (3) a control.

10. A form merging system of claim 9, wherein:

the relationship determination module is further adapted to determine a plurality of relationships between a plurality of primary form elements and a plurality of secondary form elements; and the form element addition module is further adapted to add the plurality of secondary form elements to the primary form based on the relationships between a plurality of primary form elements and a plurality of secondary form elements.

11. A form merging system of claim 8, wherein the first threshold is approximately equal to 0.33 and the second threshold is approximately equal to 0.6.

12. For use with a computer application having an original GUI-based form provided by the computer application, the original GUI-based form customized by a user to a primary GUI-based form and the original GUI-based form modified in a new version of the computer application to a secondary GUI-based form, a computer program embodied on at least one computer readable medium for merging the primary GUI-based form and the secondary GUI-based form, each form comprising one or more GUI form elements, the computer program comprising:

a first routine for comparing a primary form element of the primary form with a secondary form element of the secondary form in a automated manner;

a second routine for determining whether the primary form element is related to the secondary form element based on the comparison of the primary form element and the secondary form element; and a third routine for adding the secondary form element to the primary form if the primary form element is related to the secondary form element;

wherein the second routine determines the relationship between the primary form element and the secondary form element by:

determining a number of fields in an original form element;

determining a number of fields from the original form element belonging to the primary form element;

determining a primary field count ratio using the number of fields in the original form element and number of fields from the original form element belonging to the primary form element;

comparing the primary field count ratio to a first threshold if the name of the original form element is same as the name of the primary form element, and determining that the original form element is related to the primary form element if the primary field count ratio is above the first threshold; and if either (a) the name of the original form element is the same as the name of the primary form element and the primary field count ratio is less than the first threshold, or (b) the name of the original form element is different than the name of the primary form element, comparing the primary field count ratio to a second threshold and determining that the original form element is related to the primary form element if the primary field count ratio is greater than the second threshold, and wherein the second routine determines the relationship between the secondary form element and the original form element by:

determining a number of fields from the original form element belonging to the secondary form element;

determining a secondary field count ratio using the number of fields in the original form element and the number of fields from the original form element belonging to the secondary form element;

comparing the secondary field count ratio to the first threshold if the name of the original form element is same as the name of the secondary form element; and determining that the original form element is related to secondary form element if the secondary field count ratio is above the first threshold; and if either (a) the name of the original form element is the same as the name of the secondary form element and the secondary field count ratio is less than the first threshold, or (b) the name of the original form element is different than the name of the secondary form element, comparing the secondary field count ratio to the second threshold and determining that the original form element is related to the secondary form element if the secondary field count ratio is greater than the second threshold.

13. A computer program of claim 12, wherein the first routine compares at least one of (1) content of the primary form element with content of the secondary form element; or (2) label of the primary form element with the label of the secondary form element.

14. A computer program of claim 12, wherein the second routine determines the relationship between the primary form element and the secondary form element using a breadth-first-search algorithm.

15. A computer program of claim 12, wherein the first threshold is approximately equal to 0.33 and the second threshold is approximately equal to 0.6.

* * * * *